United States Patent
Thenappan et al.

(10) Patent No.: US 9,862,811 B2
(45) Date of Patent: Jan. 9, 2018

(54) METHODS FOR SYNTHESIZING STABILIZED POLYMERS OF CHLOROTRIFLUOROETHYLENE AND PRODUCTS MANUFACTURED USING SUCH POLYMERS

(71) Applicant: Honeywell International Inc., Morristown, NJ (US)

(72) Inventors: Alagappan Thenappan, Hackettstown, NJ (US); Eric Rainal, Morristown, NJ (US)

(73) Assignee: HONEYWELL INTERNATIONAL, INC., Morris Plains, NJ (US)

( * ) Notice: Subject to any disclaimer, the term of this patent is extended or adjusted under 35 U.S.C. 154(b) by 330 days.

(21) Appl. No.: 14/804,660

(22) Filed: Jul. 21, 2015

(65) Prior Publication Data

US 2016/0068661 A1    Mar. 10, 2016

Related U.S. Application Data

(60) Provisional application No. 62/045,746, filed on Sep. 4, 2014.

(51) Int. Cl.
  *C08K 5/19*    (2006.01)

(52) U.S. Cl.
  CPC ..................... *C08K 5/19* (2013.01)

(58) Field of Classification Search
  CPC ...................................... C08K 5/19
  See application file for complete search history.

(56) References Cited

U.S. PATENT DOCUMENTS

| 2,569,524 | A | 10/1951 | Hamilton, Jr. et al. |
| 2,613,202 | A | 10/1952 | Roedel et al. |
| 3,018,276 | A | 1/1962 | Bandes et al. |
| 4,276,214 | A | 6/1981 | Yoshimura et al. |
| 4,482,685 | A | 11/1984 | Chin et al. |
| 4,609,497 | A | 9/1986 | Cope |
| 5,833,070 | A | 11/1998 | Mizuno et al. |
| 6,777,501 | B1 | 8/2004 | Hiraga et al. |
| 6,794,487 | B2 | 9/2004 | Hiraga et al. |
| 8,124,699 | B2 | 2/2012 | Durali et al. |
| 2011/0257423 | A1 | 10/2011 | Coughlin et al. |
| 2013/0150519 | A1 | 6/2013 | Durali et al. |

OTHER PUBLICATIONS

DuPont™ ECCtreme™; ECA 3000 Fluoropolymer Resin, [online]. [Retrieved on Jul. 21, 2015] Retrieved from Internet: <URL: http://www2.dupont.com/Ecctreme/en_US/assets/downloads/Ecctreme(TM)_ECA_3000_TDS.pdf>.

(Continued)

*Primary Examiner* — John Uselding
(74) *Attorney, Agent, or Firm* — Lorenz & Kopf, LLP

(57) ABSTRACT

Methods for synthesizing stabilized polymers of chlorotrifluoroethylene and products manufactured using such polymers are disclosed herein. In one exemplary embodiment, a method for synthesizing chlorotrifluoroethylene (CTFE)-based polymers includes reacting, in the presence of an initiator and in a reaction medium at a pH of about 1.5 to about 2.5, one or more monomers comprising CTFE and after an amount of polymerization reaction time has passed, adding a neutralizing agent to the reaction medium to increase the pH of the reaction medium to within a range of about 1.8 to about 6.0.

20 Claims, 9 Drawing Sheets

(56) References Cited

OTHER PUBLICATIONS

Racha Al-Itry, Improvement of thermal stability, rheological and mechanical properties of PLA, PBAT and their blends by reactive extrusion with functionalized epoxy, Polymer Degradation and Stability, 2012, 1898-1914, 97, Elsevier.

Internationai Search Report dated Oct. 27, 2015 in International Application No. PCT/US2015/046770.

The International Bureau of WIPO, International Preliminary Report on Patetability for International Application No. PCT/US2015/046770 dated Mar. 16, 2017.

METHODS FOR SYNTHESIZING STABILIZED POLYMERS OF CHLOROTRIFLUOROETHYLENE AND PRODUCTS MANUFACTURED USING SUCH POLYMERS

CROSS-REFERENCE TO RELATED APPLICATION

This Application claims the benefit of priority to U.S. provisional patent application Ser. No. 62/045,746, filed on Sep. 4, 2014, titled "METHODS FOR SYNTHESIZING STABILIZED POLYMERS OF CHLOROTRIFLUORO-ETHYLENE AND PRODUCTS MANUFACTURED USING SUCH POLYMERS," the contents of which are herein incorporated by reference in their entirety.

TECHNICAL FIELD

The present disclosure is generally directed to the synthesis of stabilized polymers of chlorotrifluoroethylene (CTFE) and products manufactured using such polymers. More particularly, the present disclosure is directed to the synthesis of stabilized polymers of CTFE, such as homo (poly-CTFE) (PCTFE) and copolymers of CTFE, using a neutralizing agent that reduces the acidity and improves the thermal stability of such polymers, and products, such as packaging films, manufactured using such polymers.

BACKGROUND

The preparation of PCTFE is well known in the art, as well as are PCTFE-based copolymers that include, but are not limited to, CTFE-vinylidene fluoride, CTFE-tetrafluoroethylene, and CTFE-ethylene copolymers. These materials are described in detail, for example, in the ENCYCLOPEDIA OF POLYMER SCIENCE AND ENGINEERING, Sec. Ed. Vol. 3, at page 463 (Pub. John Wiley and Sons). As therein described, articles and films formed from PCTFE materials are non-flammable, resistant to chemicals and strong oxidizing agents, and exhibit desirable moisture barrier properties.

There are presently known a variety of processes that are suitable for the formation of CTFE-based polymers. High molecular weight homo and copolymers of CTFE may be prepared by free radical-initiated polymerization either in bulk, suspension, or aqueous emulsion via the use of a suitable initiator system or in the alternative by ionizing radiation.

PCTFE formed by an aqueous suspension process employs redox initiators such as alkaline metal persulfates and bisulfites with iron, copper, or silver salts as catalysts under acidic conditions ($pH \leq 2.0$). The PCTFE polymer produced by this method is acidic and exhibits poor thermal stability during processing at temperatures from about 275° C. to about 325° C. The poor thermal stability is attributed to encapsulation of the polymer with inorganic moieties from the initiating species at one or both ends. These ionic end groups may undergo hydrolysis during work-up to form unsaturated olefins and carboxylic acids. Thus, thermally-pressed plaques prepared from PCTFE samples produced by the above method often undesirably show bubbles and discoloration, which is thought to be due to low molecular weight oligomers formed at the end of the polymerization when the reaction is taken to high conversion. Acidic PCTFE polymers extract metals from the reactors to form metal salts during work-up. Encapsulation of inorganic moieties produce PCTFE resin with a relatively high content of residual ash, which limits the range of applications within which articles formed using the PCTFE polymer resin may be used. Such polymeric materials are known to have lower dielectric strengths, which often render them undesirable for use in electrical and electronic devices and/or packaging.

PCTFE polymers produced by the emulsion polymerization method require a surfactant to form a stable emulsion. Most surfactants are fluorinated compounds with a polar head group, and removal of the surfactant is an important part of the work-up process. Complete removal is often very difficult depending on the extent of adsorption to the polymer particles. Further, recent studies indicate that these surfactants are bioaccumulable, toxic, and environmentally persistent.

Regardless of the method employed, PCTFE homopolymer has a strong tendency to crystallize and thus molecular weights are kept high to maintain the degree of crystallinity for optimum physical, mechanical, electrical, and barrier properties. Degradation of the polymer during processing and polymer acidity should be reduced for most end use applications. This may be achieved by neutralizing the PCTFE polymer with a suitable neutralizing agent such as a buffer solution or an aqueous base.

Therefore, it will become apparent to those skilled in the art that there remains a present and continuing need for improved PCTFE homo and copolymers that are suitable for the production of articles therefrom when processed at elevated temperatures, or to be included in the structure of the formed article. There also remains a continuing need in the art for the production of thermally stable, neutral PCTFE homo and copolymers that have improved machine processability, particularly with regard to melt-extrusion, pelletization, thermoforming, and lamination. Still further, other desirable features and characteristics of the present subject matter will become apparent from the subsequent detailed description of the inventive subject matter and the appended claims, taken in conjunction with the accompanying drawings and this background of the disclosure.

BRIEF SUMMARY

Methods for synthesizing stabilized polymers of chlorotrifluoroethylene and products manufactured using such polymers are disclosed herein. In one exemplary embodiment, a method for synthesizing chlorotrifluoroethylene (CTFE)-based polymers includes reacting, in the presence of an initiator and in a reaction medium at a pH of about 1.5 to about 2.5, one or more monomers comprising CTFE and after an amount of polymerization reaction time has passed, adding a neutralizing agent to the reaction medium to increase the pH of the reaction medium to within a range of about 1.8 to about 6.0.

This brief summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE FIGURES

The present disclosure will hereinafter be described in conjunction with the following drawing figures, wherein like numerals denote like elements, and wherein.

DETAILED DESCRIPTION

Figure 1:
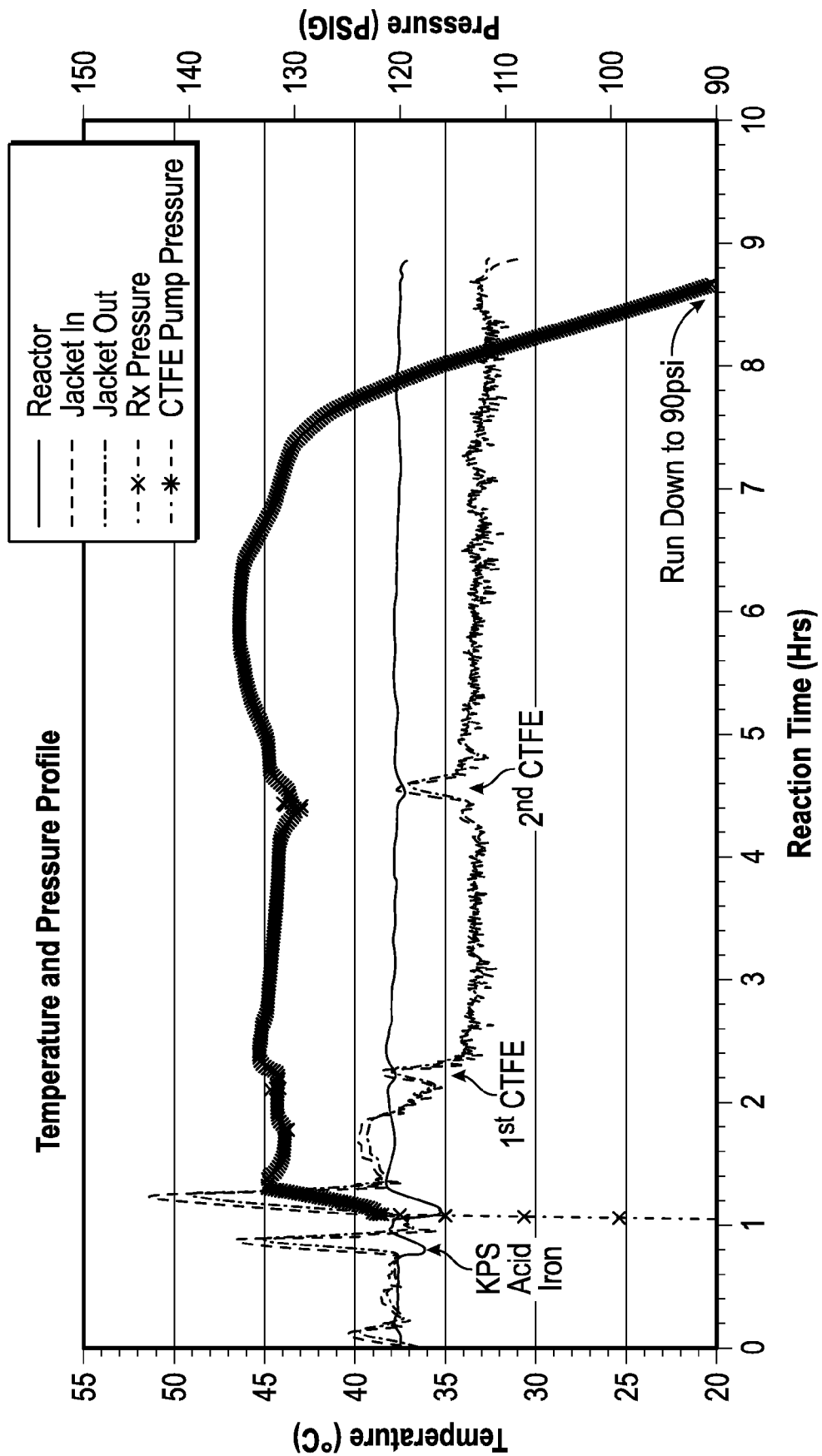
FIG. 1 is a plot illustrating temperatures and pressures, over time, within a reaction vessel during synthesis of a CTFE-based polymer in accordance with prior art techniques.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

The present disclosure provides methods for the synthesis of stabilized polymers of CTFE, such as PCTFE and copolymers of CTFE, with a neutralizing agent that reduces the acidity and improves the thermal stability of such polymers, and products, such as packaging films, manufactured using such polymers. In some embodiments, the neutralizing agent may be provided as an aqueous base, while in other embodiments, the neutralizing agent may be provided as a buffer solution.

In some embodiments, where an aqueous base neutralizing agent is employed, sodium or potassium hydroxide solutions neutralize the polymer. The amount of such solutions added to the reaction medium for neutralization is carefully controlled in order to maintain the pH of the reaction medium at neutral or slightly below neutral in the acidic region (<7) to retain the clarity of the polymer formed in the reaction medium (as noted above, the addition of a slight excess of base raises the pH to the alkaline region (>7) and causes the color of the PCTFE polymer to become yellow to brown). Accordingly, in these embodiments, the pH is preferably controlled from about 3 to about 7 to minimize undesirable color development in the polymer.

In preferred embodiments, however, in order to maintain a controlled pH, a buffer solution is employed as the neutralizing agent. As used herein, the term "buffer solution" refers to an aqueous solution consisting of a mixture of a weak acid and its conjugate base or a weak base and its conjugate acid. The buffer solution achieves its resistance to pH change because of the presence of an equilibrium between its components. Buffer solutions may be acidic or basic and have a useful pH range to select from. Preferred buffer solutions that may be employed in the practice of the presently-described embodiments include an acidic buffer solution with a pH of about 3.0 to about 7.0. Examples of suitable acidic buffer solutions include acetate-, citrate-, lactate-, and phosphate-based buffer solutions.

In addition to the desired pH range, the buffer solution that is selected is preferably soluble in water so that it may be removed after neutralization. Among the aforementioned exemplary acidic buffer solutions, acetate- and lactate-based buffer solutions have relatively higher solubility in water than citrate- and phosphate-based buffer solutions. Based on solubility and pH range, lactate- and acetate-based buffer solutions are preferred, and lactate-based buffer solutions are most preferred for the practice of the presently-described embodiments. Lactate-based buffer solutions have a useful pH range of about 4.0 to about 6.0 and include lactic acid and a salt of lactic acid such as sodium, potassium, and/or ammonium. Among the lactate-based buffer solutions, ammonium lactate is particularly preferred because of its solubility and absence of any metallic ions. It is commercially available from Univar Inc. of Downers Grover, Ill., USA, in wide range of concentrations and is stable at ambient conditions. A 65 weight-% aqueous ammonium lactate solution has a pH of about 4.8 Ammonium lactate buffer solutions can also be washed out with water upon completion of its neutralization function in the CTFE polymer reaction medium.

The addition of an ammonium lactate solution serves to neutralize the reaction medium from an acidic pH to a near-neutral pH (for example, from about 1.8 to about 6.0, such as from about 1.8 to about 5.0, more preferably from about 3.0 to about 5.0, and most preferably from about 4.0 to about 5.0). A preferred concentration of the ammonium lactate buffer solution is from about 5 weight-% to about 75 weight-% in an aqueous solution. A more preferred concentration is from about 20 weight % to about 65 weight-%, and the most preferred concentration is from about 40 weight-% to about 65 weight-% in an aqueous solution. The amount of ammonium lactate buffer solution added to the reaction mixture (based upon the total weight of the monomer added to the reaction mixture) may be for example from about 1.0 to about 5.0 mole-%, for example from about 1.0 mole-% to about 3.0 mole-%, such as from about 1.0 mole-% to about 2.0 mole-%.

In addition to neutralization, some neutralizing agents such as ammonium lactate also beneficially terminate the polymerization reaction. Reaction termination and solution neutralization using, for example, an ammonium lactate buffer solution has been surprisingly found to result in a CTFE polymer product that exhibits significantly increased thermal stability over CTFE polymer products that have been neutralized using other solutions. Thermogravimetric analyses (described in greater detail below with regard to FIG. 7) at 300° C. indicate that ammonium lactate-neutralized polymers exhibit about 25% to about 30% improvement in thermal stability. Furthermore, the CTFE polymer products that are produced according to the disclosed methods do not discolor or form bubbles during thermal processing, such as film extrusion, at temperatures from about 275° C. to about 325° C.

An exemplary process for synthesizing a CTFE polymer in accordance with the present disclosure is provided in the following paragraphs. In a first step of the CTFE-based polymer synthesis described herein, CTFE, with the optional addition of one or more further monomers, is/are subjected to a polymerization process in the presence of a solvent and an initiator.

The term "monomer" as used herein means a polymerizable alkene that optionally contains at least one halogen atom, halo-alkyl group, or halo-alkoxy group attached to a carbon atom that is part of the double bond of the alkene that undergoes polymerization. The term "polymer" means a polymer derived by the polymerization of one or more such monomers. Examples of monomers which, in addition to CTFE, may be used in the polymerization process of the present disclosure to form copolymers of CTFE include, for example, vinylidene fluoride (VDF), 1,2-difluoroethylene, vinylidene chloride (VDC), 1,1-dichlorodifluoroethylene, 1,2-dichlorodifluoroethylene, 1-chloro-1-fluoroethylene, tetrafluoroethylene (TFE), trifluoroethylene, vinyl fluoride, hexafluoropropylene (HFP), hexafluoroisobutylene, perfluorobutylethylene (PFBE), pentafluoropropene, 3,3,3-trifluoro-1-propene, 2,3,3,3-tetrafluoropropene, 1,3,3,3-tetrafluoropropene, fluorinated vinyl ethers (such as perfluoromethyl vinyl ether (PMVE) or perfluoropropylene vinyl ether (PPVE)), fluorinated allyl ethers, fluorinated dioxoles; olefins such as ethylene, propylene, isobutylene and functionalized olefins such as vinyl acetate, vinyl propionate, allylmethacrylate, ethylene glycol dimethacrylate, trimethylolpropane triacrylate, maleic anhydride, itaconic acid, and combinations thereof, among others as are known in the art. In a particular embodiment, the only monomer used in the polymerization process is CTFE, and hence to polymer produced is PCTFE.

The term "initiator" and the expressions "radical initiator" and "free radical initiator" refer to a chemical that is capable of providing a source of free radicals, either induced spontaneously, or by exposure to heat or light. The term "radical" and the expression "free radical" refer to a chemical species that contains at least one unpaired electron. Any commercially available radical initiator may be used in the presently-described embodiments. Suitable initiators include, for example: metal persulfates such as sodium persulfate, potassium persulfate and ammonium persulfate; organic peroxides or hydroperoxides such as diacyl peroxides, ketone peroxides, peroxyesters, dialkyl peroxides and peroxy ketals, peroxypivalates, peroxydicarbonates, transition metal carbonyls, and azo compounds such as 2,2'-azobisisobutyronitrile and water soluble analogues thereof, and mixtures of any of the foregoing.

Additionally, any redox initiator system known to be useful in the preparation of fluoropolymers such as PCTFE may be used in the described embodiments. Typical redox initiator systems include: 1) an organic or inorganic oxidizing agent or mixtures thereof; and 2) an organic or inorganic reducing agent or mixtures thereof. Suitable oxidizing agents include metal persulfates such as sodium persulfate, potassium persulfate and ammonium persulfate; peroxides such as hydrogen peroxide, potassium peroxide, ammonium peroxide, tertiary butyl hydroperoxide (TBHP), cumene hydroperoxide, and t-amyl hydroperoxide, manganese triacetate, potassium permanganate, ascorbic acid and mixtures thereof. Suitable reducing agents include sodium sulphites such as sodium bisulfite, sodium sulphite, sodium pyrosulfite, sodium-m-bisulfite (MBS), and sodium thiosulfate; other sulphites such as ammonium bisulfite, hydroxylamine, hydrazine, ferrous iron, organic acids such as oxalic acid, malonic acid, and citric acid and mixtures thereof. Redox initiator systems are the preferred initiator for the invention. Preferred redox initiator systems use potassium persulfate as the oxidizing agent and MBS reducing agent. In a more preferred embodiment, the redox initiator system is used in conjunction with a transition metal accelerator. Accelerators can greatly reduce the polymerization time. Any commercially available transition metal may be used as an accelerator. Preferred transition metals include copper, silver, titanium, ferrous iron ($Fe^{2+}$), and mixtures thereof. Ferrous iron is most preferred.

Still further, the radical initiator may include a persulfate salt, such as sodium persulfate, potassium persulfate, or ammonium persulfate. The amount of persulfate salt added to the reaction mixture (based upon the total weight of the monomer added to the reaction mixture) may be for example from about 0.002 to about 1.0 weight percent. Alternatively, the radical initiator may include an organic peroxide such as an alkyl, dialkyl, or diacyl peroxide, and peroxy esters or mixtures thereof. Exemplary dialkyl peroxides are di-tert-butylperoxide (DTBP), dibenzoyl peroxide, or 2,5-dimethyl-2,5-di(tert-butylperoxy)hexane, which may be added to the reaction mixture in an amount from about 0.01 to about 5 weight percent based on total monomer, and more preferable in an amount from about 0.05 to about 2.5 weight percent based on total monomer. Exemplary peroxydicarbonate initiators are di-n-propyl peroxydicarbonate, bis (tert-butyl cyclohexyl) peroxydicarbonate and diisopropyl peroxydicarbonate, which may be added to the reaction mixture in an amount from about 0.5 to about 2.5 weight percent based on total monomer. Peroxy ester initiators include tert-amyl peroxypivalate, tertbutyl peroxypivalate (TBPPi), and succinic acid peroxide. Transition metal carbonyls include dimanganese decacarbonyl. Further alternatively, the radical initiator may include an azo initiator, such as 2,2'-azobis(2-methylpropionamidine) dihydrochloride.

The polymerization reaction may be carried out in a suitable reaction vessel. The only requirement for the reaction vessel used to prepare the polymers of the disclosure is that it be capable of being pressurized and agitated. Conventional, commercially-available autoclaves that can be sealed and pressurized to the required reaction pressures (preferably in excess of 3.36 MPa (500 psig) for safety considerations) are preferred. Horizontally-inclined autoclaves are preferred to vertically inclined autoclaves, although either geometry may be used.

The polymerization is conducted in an aqueous reaction medium. In some embodiments, the reaction medium is deionized, nitrogen-purged water. Generally, an amount equivalent to about half the capacity of the reaction vessel is used. The ratio of polymer to water is chosen in such a way as to obtain a dispersion of from about 10% to about 70% polymer solids in water. The water is pre-charged to the autoclave.

Surfactants may also be used to provide further stability to the polymer emulsion formed in the reaction medium as the polymerization reaction proceeds in time. Exemplary surfactants are non-fluorinated hydrocarbon surfactants, siloxane surfactants, or a combination thereof. For example, the monomer(s) may be used in combination with sodium dodecyl sulfate, sodium dodecyl benzene sulfonate (SD-DBS), sodium octyl sulfonate, sodium lauryl sulfate, ammonium lauryl sulfate, and sodium laureth sulfate, among others, as surfactants.

The polymerization reaction medium may optionally contain a chain transfer agent to regulate the molecular weight of the polymer product. Chain transfer agents may be added to a polymerization reaction in a single portion at the beginning of the reaction, or incrementally or continuously throughout the reaction. The amount and mode of the addition of a chain-transfer agent depends on the activity of the particular chain-transfer agent employed, and on the desired molecular weight of the polymer product. The amount of chain-transfer agent added to the polymerization reaction is from about 0.05 to about 5 weight-%, for example from about 0.1 to about 2 weight-% based on the total weight of comonomer added to the reaction mixture. Suitable chain transfer agents include oxygenated compounds such as alcohols, carbonates, ketones, esters, ethers, halocarbons and hydrohalocarbons such as chlorocarbons, and mixtures of any of the foregoing.

A paraffin wax or hydrocarbon oil may optionally be added to the reaction medium. The optional addition of the paraffin wax or hydrocarbon oil to the reaction serves as an antifoulant to minimize or prevent polymer adhesions to the reactor components. Any long chain saturated hydrocarbon wax or oil may be used to perform this function. The amount of oil or wax added to the reactor is an amount that serves to minimize the formation of polymer adhesions on the reactor components. The amount is generally proportional to the interior surface area of the reactor and may vary from about 0.5 to about 50 mg per square centimeter of reactor interior surface area.

The monomers may be charged to the reactor vessel either semi-continuous or a continuous manner during the course of the polymerization. "Semi-continuous" means that a number of batches of the monomers are charged to the reactor during the course of the polymerization reaction. The batch size is determined by the desired operating pressure. The molar ratio of total monomer to radical initiator will depend upon the overall particle size and molecular weight desired. Preferably, the overall molar ratio of monomer to initiator will be from about 10 to about 10,000, more preferably from about 50 to about 1000, and most preferably from about 100 to about 500 moles of total monomer to 1 mole of initiator.

The radical initiator is generally added incrementally over the course of the reaction. For purposes of this disclosure, "initial charge" or "initial charging" of initiator refers to a rapid, large, single or incremental addition of initiator to effect the onset of polymerization. In the initial charge, generally from about 10 ppm/minute to about 1000 ppm/minute is added over a period of from about 3 to about 30 minutes, either before, after, or during the charging of the monomers. "Continuous charge" or "continuous charging" means the slow, small, incremental addition of initiator over a period of from about 1 hour to about 10 hours until polymerization has concluded. In the continuous charge, generally from about 0.1 ppm/minute to about 30 ppm/minute of initiator is added.

During the initiation of the polymerization reaction, the sealed reactor vessel and its contents are maintained at the desired reaction temperature, or alternatively to a varying temperature profile which varies the temperature during the course of the reaction. Control of the reaction temperature is one determining factor for establishing the final molecular weight of the polymers produced. As a general rule, polymerization temperature is inversely proportional to product molecular weight. Typically, the reaction temperature should be from about 0° C. to about 120° C., although temperatures above and below these values are also contemplated. Preferably the reaction temperature should be from about 10° C. to about 60° C. The pressure used for polymerization may vary from about 170 kPa to about 5.5 MPa, depending on the capabilities of the reaction equipment, the initiator system chosen, and the monomer(s) selection. For example, in an embodiment, the polymerization pressure may from about 300 kPa to about 4.2 MPa. Elevated pressures and temperatures are known to yield greater reaction rates.

The polymerization is preferable conducted under agitation to ensure proper mixing. An adjustment of the agitation rate during the respective polymerization may be necessary to prevent premature coagulation of the particles. Although the agitation rate and reaction time will typically depend upon the amount of polymeric product desired, one of ordinary skill in the art can readily optimize the conditions of the reaction without undue-experimentation to get the claimed results. The agitation rate will generally be in the range of from about 5 to about 1000 rpm and, preferably from about 25 to 800, depending on the geometry of the agitator and the size of the vessel. The reaction time will generally range from about 1 to about 24 hours, and preferably from about 1 to about 12 hours. After the reaction time has passed, the CTFE-based polymers produced by the process of the present disclosure may be isolated by conventional methods such as evaporating the aqueous medium, freeze-drying the aqueous medium, or adding a minor amount of an agglomerating or coagulating agent such as ammonium carbonate, followed by filtration or centrifuging, and drying.

According to one embodiment of the present disclosure, the CTFE-based polymer synthesis process may proceed according to the following steps: A pressurized polymerization reactor equipped with a stirrer and heat controller is charged with a solvent, for example deionized water, and optional co-solvent, one or more monomers including at least CTFE, and an initiator. The mixture may additionally contain one or more of a surfactant, a chain transfer agent, and an antifoulant.

Prior to introduction of the monomer(s), air is removed from the reactor in order to obtain an oxygen-free environment for the polymerization reaction. The order in which the polymerization components are assembled may be varied. In one embodiment, solvent(s), initiator, monomer(s), and optionally surfactant, antifoulant, and/or chain transfer agent are charged to the reactor, and the reactor is heated to the desired reaction temperature. The additional monomer(s) is then fed into the reactor at a rate that provides an essentially constant pressure. Other variations for polymerization processes are contemplated, as known in the art. The feed is terminated when the desired weight has been fed to the reactor. Additional radical initiator is optionally added, and the reaction is allowed to react out for a suitable amount of time. The reactor pressure drops as the monomer(s) within the reactor is consumed.

The polymerization is conducted under agitation to ensure proper mixing. An adjustment of the agitation rate during the polymerization may be desirable to prevent premature coagulation of the particles. Although the agitation rate and reaction time will typically depend upon the amount of polymer product desired, one of ordinary skill in the art may readily optimize the conditions of the reaction without undue experimentation. The agitation rate will generally be in the range of from about 5 to about 800 rpm, for example from about 25 to about 700 rpm, depending on the geometry of the agitator and the size of the vessel. The reaction time will generally range from about 1 to about 30 hours, for example from about 4 to about 20 hours.

Additional agents that may be added to the reaction mixture at various points in the polymerization reaction process include neutralization agents and reaction termination agents. As used herein, the term "reaction termination agent" refers to a compound which, when added to the reaction mixture, prevents further polymerization of any un-reacted monomers and as such terminates the polymerization reaction. Thus, the polymerization reaction may be terminated after passing of the above-mentioned reaction time using the reaction termination solution. As noted above, neutralization of the reaction medium may be performed in order prevent degradation of the polymer product (such as discoloration) during subsequent thermal processing, such as film extrusion.

In accordance with embodiments of the present disclosure, the steps of reaction termination and solution neutralization may be performed using the same agent, i.e., an agent that possesses the properties of both reaction termination and solution neutralization. For example, the previously-described buffer solution of ammonium lactate may be added to the reaction mixture at the desired end time of the polymerization reaction (which may be predetermined) to perform the dual functions of reaction termination and solution buffering/neutralization. Others of the above-described neutralization agents may alternatively or additionally be added at this time. The ammonium lactate solution, or other neutralization agent, is added after the reaction time as expired, which may be from about 1 hour to about 24 hours after initiation of the reaction, for example from about 1 hour to about 12 hours after initiation of the reaction. It may be added at any suitable reaction pressure, for example from about 50 $psi_g$ to about 150 $psi_g$, such as from about 85 $psi_g$ to about 135 $psi_g$.

With continued reference to the exemplary embodiment employing the ammonium lactate solution as the neutralization agent, the addition of the ammonium lactate solution to the reaction medium also beneficially prevents further polymerization of any unreacted monomers, and thus terminates the polymerization reaction. The addition of the ammonium lactate solution also brings the reaction mixture closer to a neutral pH, which assists in reducing polymer degradation during thermal processing. For example, the polymerization reaction may proceed during the reaction time at a pH that may be from about 1.5 to about 2.5, such as at a pH of about 2.0 Ammonium lactate, as is known in the art, has a nominal pH of about 4.8, when used at about 65 weight-% in an aqueous solution. The addition of an ammonium lactate solution serves to neutralize the reaction medium from an acidic pH to a near-neutral pH (for example, from about 1.8 to about 6.0, such as from about 1.8 to about 5.0, more preferably from about 3.0 to about 5.0, and most preferably from about 4.0 to about 5.0). In some embodiments, the use of other buffering solutions may be avoided during the polymerization reaction and prior to the introduction of the ammonium lactate solution.

After addition of the ammonium lactate solution, and completion of the polymerization reaction, the reactor is brought to ambient temperature and any residual unreacted components are vented to atmospheric pressure. In some embodiments, a "heat-up/cool-down" procedure is employed, wherein after reaction termination, the reactor temperature is briefly increased, for example to a temperature of about 50° C. to about 60° C., such as about 55° C. and then reduced to a temperature of about 30° C. to about 40° C., such as about 35° C. The heat-up/cool-down procedure may be performed over the course of about 30 minutes to about two hours, such as about an hour. The reaction medium containing the product polymer is then recovered from the reactor. The recovered material includes a stable mixture of the reaction components, i.e., solvent, initiator (and/or decomposition products of the initiator), and product polymer solids. The product mixture containing the product polymer is filtered, washed with deionized water, and then dried to constant weight to give a solid polymer compound. Alternatively, the product mixture containing the product polymer is filtered off to remove the solvents and the resulting crude product is solubilized in an organic solvent and then precipitated out using a different solvent. The precipitated product is dried to constant weight to give a solid-phase product polymer compound.

In particular embodiments, the product polymer formed as a result of the above-described polymerization reaction may be PCTFE or a copolymer of CTFE with one or more of vinylidene fluoride, 1,2-difluoroethylene, vinylidene chloride (VDC), 1,1-dichlorodifluoroethylene, 1,2-dichlorodifluoroethylene, 1-chloro-1-fluoroethylene, tetrafluoroethylene, trifluoroethylene, vinyl fluoride, hexafluoropropylene (HFP), hexafluoroisobutylene, perfluorobutylethylene, pentafluoropropene, 3,3,3-trifluoro-1-propene, 2,3,3,3-tetrafluoropropene, 1,3,3,3-tetrafluoropropene, fluorinated vinyl ethers (such as perfluoromethyl vinyl ether or perfluoropropylene vinyl ether), fluorinated allyl ethers, fluorinated dioxoles; olefins such as ethylene, propylene, isobutylene and functionalized olefins such as vinyl acetate, vinyl propionate, allylmethacrylate, ethylene glycol dimethacrylate, trimethylolpropane triacrylate, maleic anhydride, itaconic acid, and combinations thereof, among others as are known in the art. The product polymer surprisingly features improved thermal stability and improved machine processability, particularly with regard to melt-extrusion, pelletization, thermoforming, and lamination at temperatures from about 275° C. to about 325° C., such as at temperatures of about 300° C.

The product polymers of the present disclosure may find application with a variety of commercial uses. The uses include, for example, barrier films for pharmaceutical and medical packaging, linings for chemical processing equipment, gas separation membranes, wire insulation, cable jackets, hoses, tubing, seals, gaskets, and O-rings, dispersions for textile treatment, and the like. Various thermal processing techniques suitable for use in forming the foregoing commercial products are well-known to those having ordinary skill in the art.

Illustrative Examples

The present disclosure is now illustrated by the following non-limiting examples. It should be noted that various changes and modifications may be applied to the following examples and processes without departing from the scope of this invention, which is defined in the appended claims. Therefore, it should be noted that the following examples should be interpreted as illustrative only and not limiting in any sense.

In accordance with a first example, a PCTFE polymer was produced using conventional processing techniques. 5 kg of CTFE monomer was charged to a 30 gallon reactor vessel at 37.7° C. and at a pressure of 122 $psi_g$, along with deionized water as a solvent, and potassium persulfate with iron as an initiator. The reaction was allowed to proceed for a time period of about 8 hours. An additional 10 kg of CTFE was added at about 1 hour after reaction initiation, and a further additional 10 kg of CTFE was added at about 3.5 hours after reaction initiation, for a total of 25 kg of CTFE. The pH of the reaction mixture, throughout the reaction process, remained at about 2.0. No reaction termination or buffering/neutralization agents were used. FIG. 1 illustrates the temperature and pressure within the reaction vessel during the polymerization reaction process. As shown, the pressure within the reactor vessel was allowed to run-down to about 90 $psi_g$ at the end of the reaction process.

Figure 2:
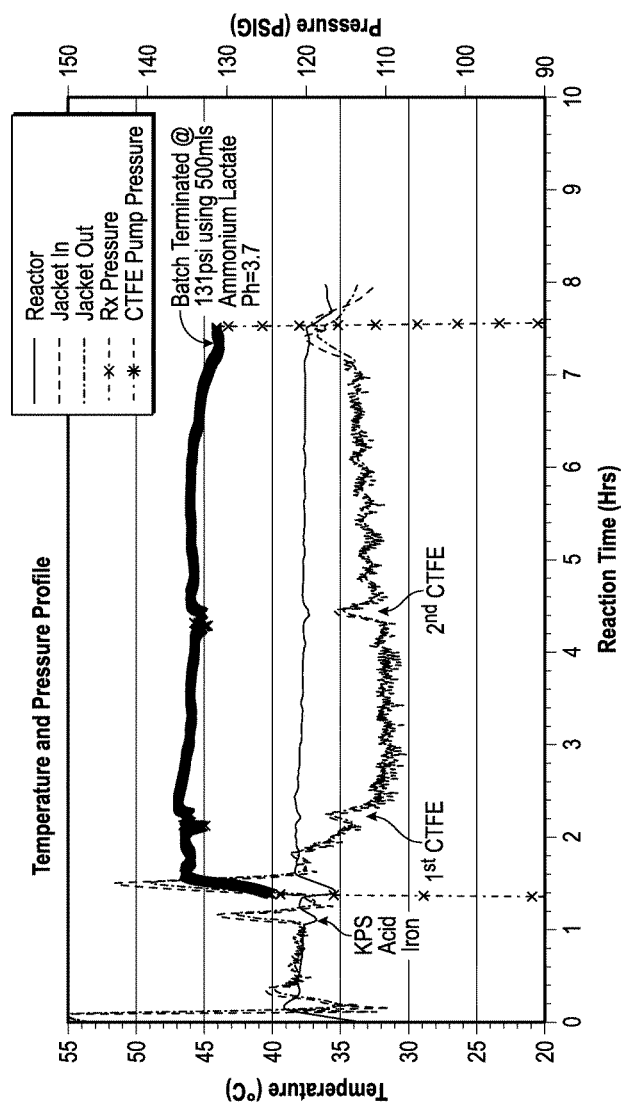
FIGS. 2-6 are plots illustrating temperatures and pressures, over time, within a reaction vessel during synthesis of a CTFE-based polymer in accordance with various embodiments of the present disclosure.

In accordance with a second example, a PCTFE polymer was produced using the processing techniques substantially as described above with regard to the first example, with the exception that the polymerization reaction was terminated at a pressure of 131 $psi_g$ using 500 mL of a 65 wt. % ammonium lactate aqueous solution. FIG. 2 illustrates the temperature and pressure within the reaction vessel during the polymerization reaction process. The addition of the ammonium lactate solution, in addition to terminating the polymerization reaction, increased the pH of the reaction mixture to about 3.7.

Figure 3:
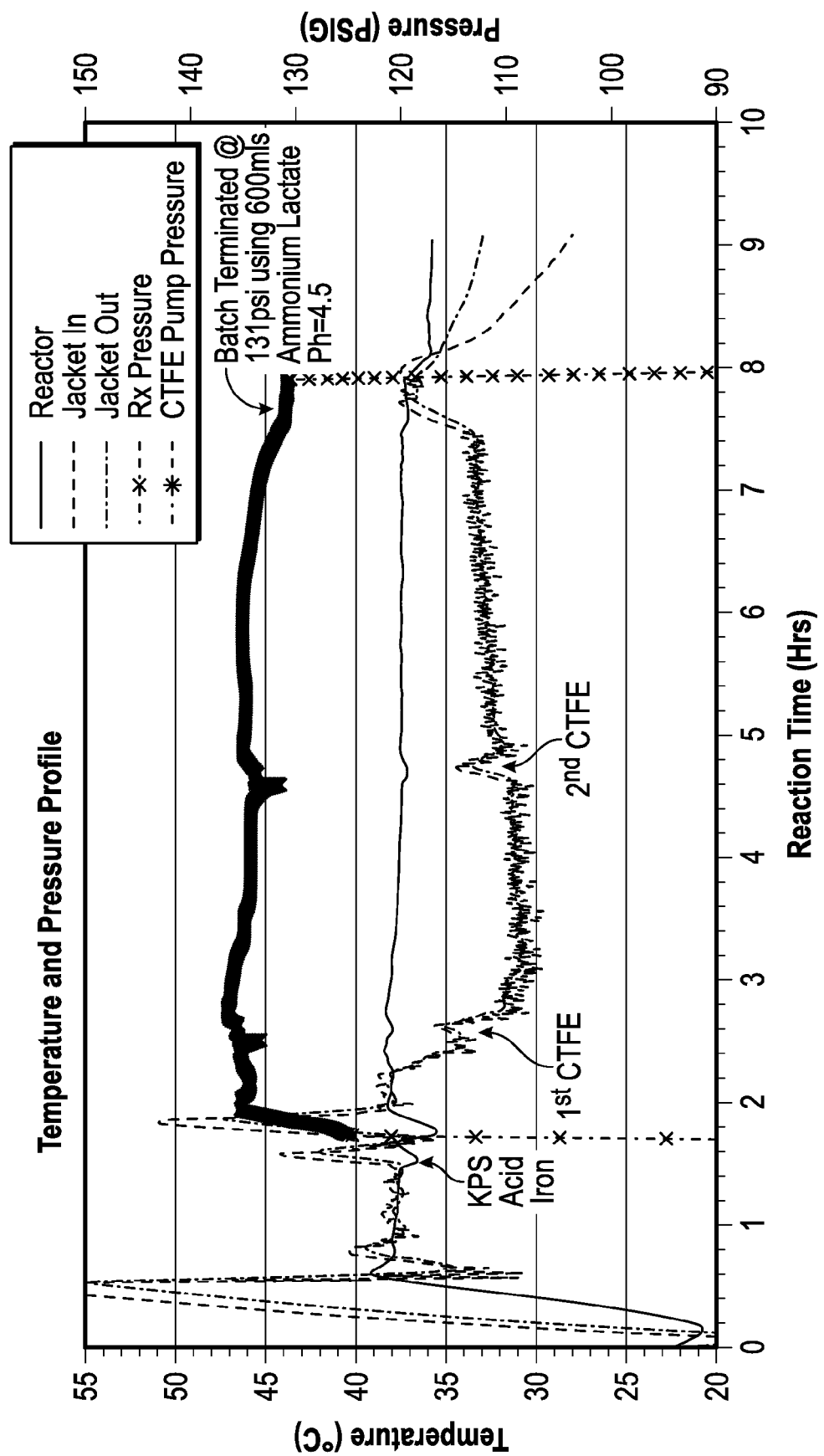

In accordance with a third example, a PCTFE polymer was produced using the processing techniques substantially as described above with regard to the first example, with the exception that the polymerization reaction was terminated at a pressure of 131 $psi_g$ using 600 mL of a 65 wt. % ammonium lactate aqueous solution. FIG. 3 illustrates the temperature and pressure within the reaction vessel during the polymerization reaction process. The addition of the ammonium lactate solution, in addition to terminating the polymerization reaction, increased the pH of the reaction mixture to about 4.5.

Figure 4:
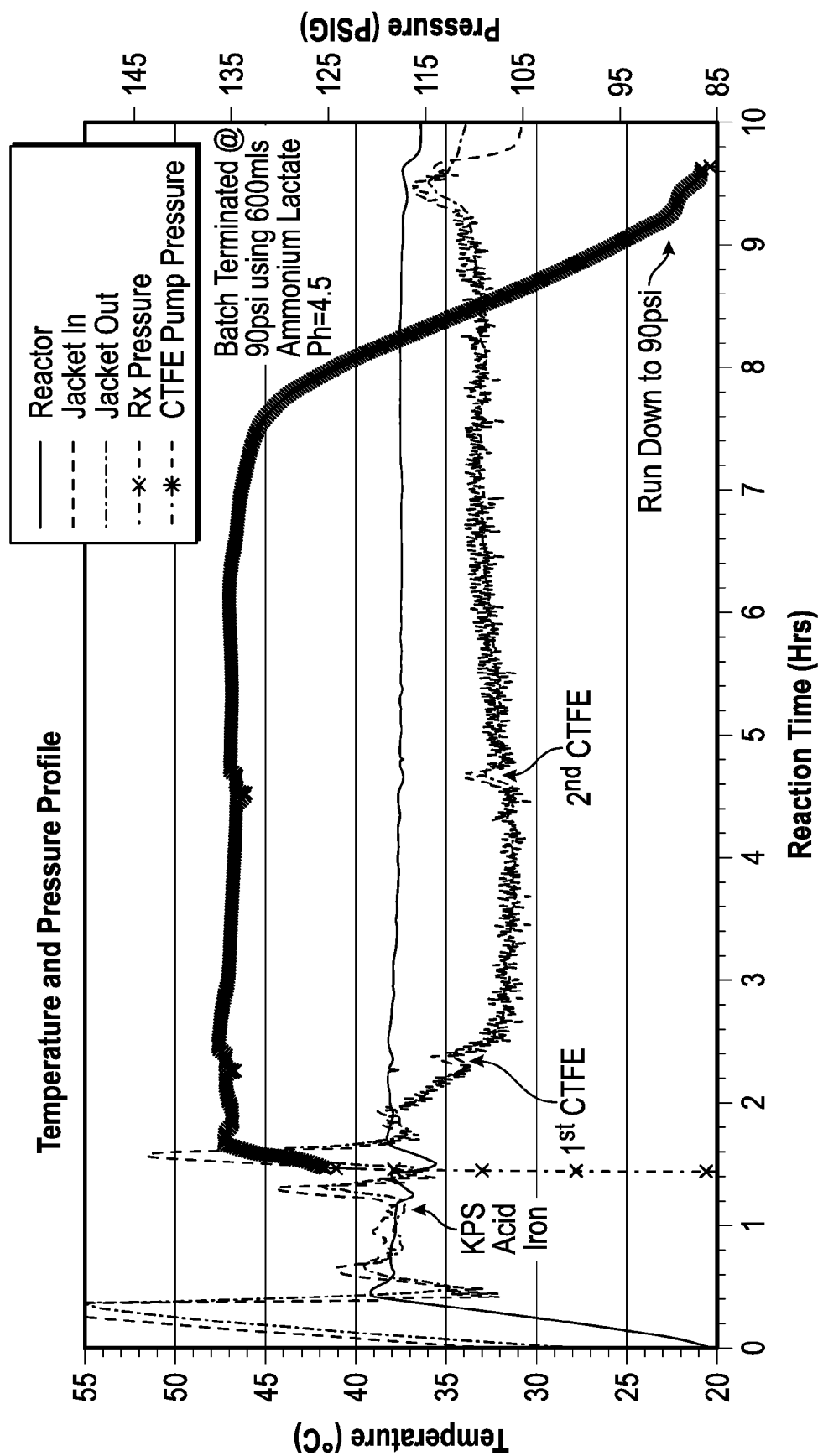

In accordance with a fourth example, a PCTFE polymer was produced using the processing techniques substantially as described above with regard to the first example, with the exception that the polymerization reaction was terminated at a pressure (after run-down) of 90 $psi_g$ using 600 mL of a 65 wt. % ammonium lactate aqueous solution. FIG. 4 illustrates the temperature and pressure within the reaction vessel during the polymerization reaction process. The addition of the ammonium lactate solution, in addition to terminating the polymerization reaction, increased the pH of the reaction mixture to about 4.5.

Figure 5:
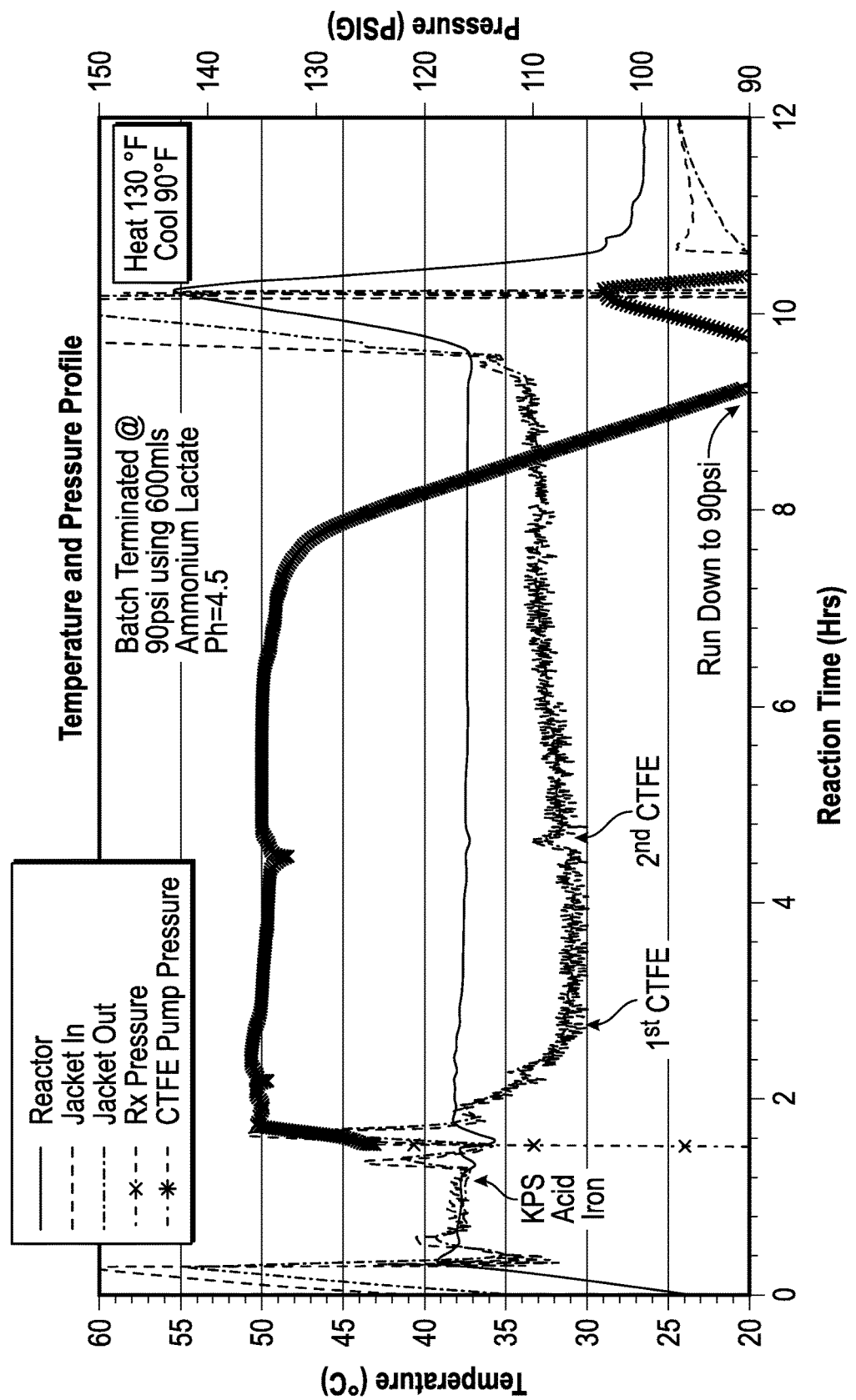

In accordance with a fifth example, a PCTFE polymer was produced using the processing techniques substantially as described above with regard to the first example, with the exception that the polymerization reaction was terminated at a pressure (after run-down) of 90 $psi_g$ using 600 mL of a 65 wt. % ammonium lactate aqueous solution. Additionally, a "heat-up/cool-down" process was employed, wherein after the pressure run-down process, the temperature was increased to about 55° C. and then decreased to about 35° C. FIG. 5 illustrates the temperature and pressure within the reaction vessel during the polymerization reaction process. The addition of the ammonium lactate solution, in addition to terminating the polymerization reaction, increased the pH of the reaction mixture to about 4.5.

Figure 6:
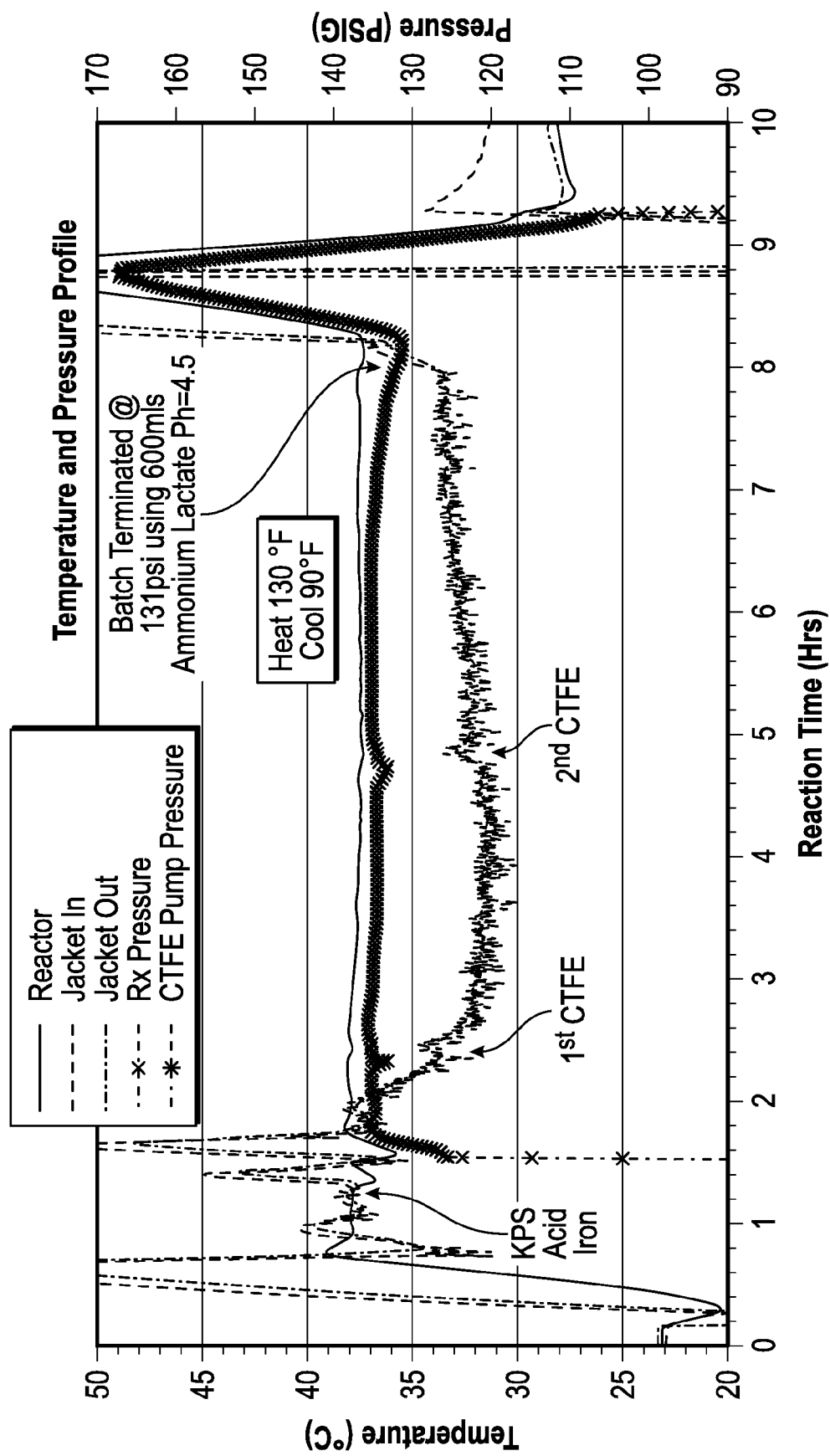

In accordance with a sixth example, a PCTFE polymer was produced using the processing techniques substantially as described above with regard to the first example, with the exception that the polymerization reaction was terminated at a pressure of 131 $psi_g$ using 600 mL of a 65 wt. % ammonium lactate aqueous solution. Additionally, a "heat-up/cool-down" process was employed, wherein after the pressure run-down process, the temperature was increased to about 55° C. and then decreased to about 35° C. FIG. 6 illustrates the temperature and pressure within the reaction vessel during the polymerization reaction process. The addition of the ammonium lactate solution, in addition to terminating the polymerization reaction, increased the pH of the reaction mixture to about 4.5.

Figure 7:
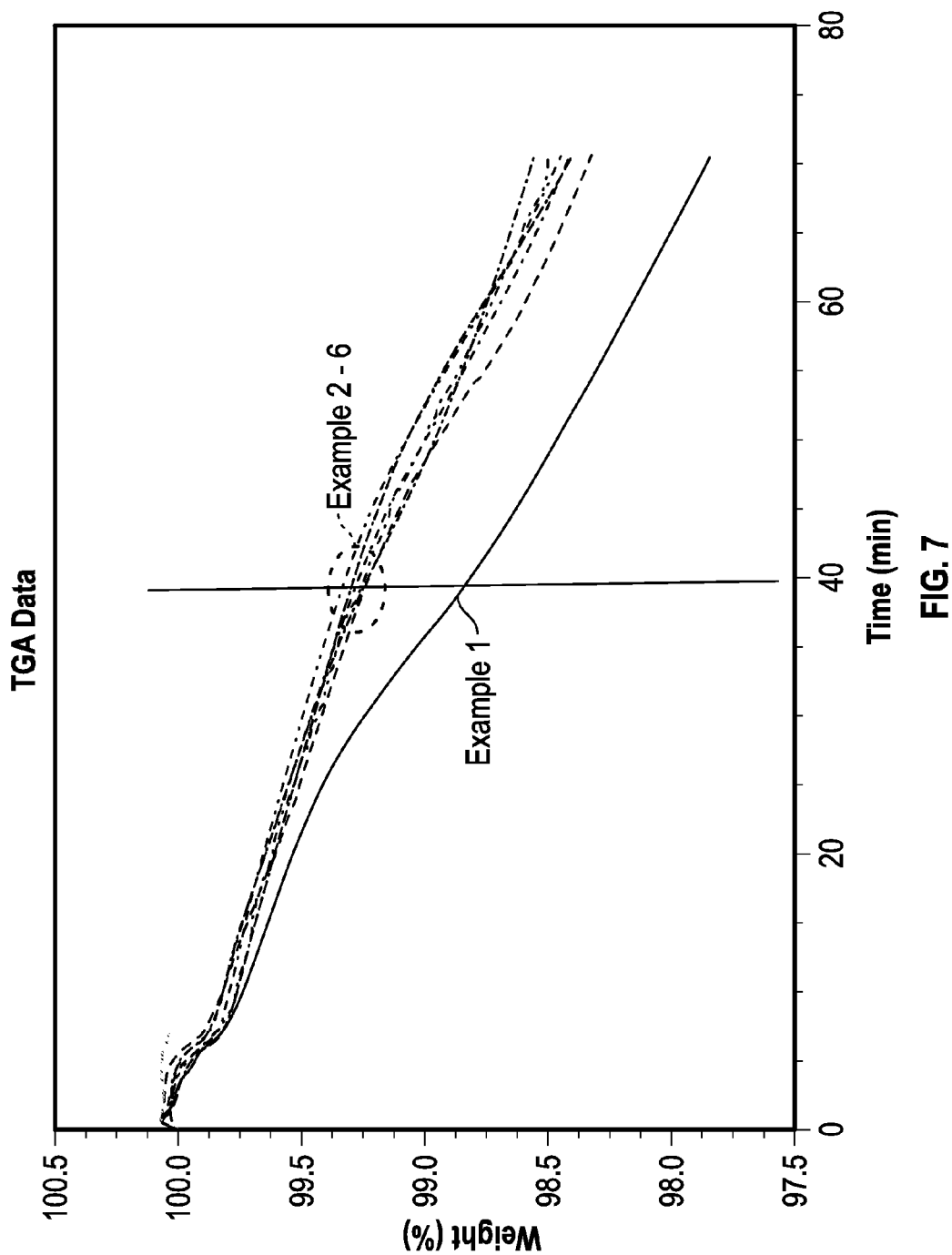
FIG. 7 is a plot illustrating the results of thermogravimetric analysis on the polymers produced by the synthesis methods illustrated in FIGS. 1-6.

FIG. 7 provides a thermogravimetric analysis (TGA) of prior art example 1 as compared to examples 2-6 in accordance with the present disclosure. The TGA was performed at a temperature of 300° C. The polymer in accordance with prior art example 1 exhibited an average weight loss percentage, after 41 minutes, of 1.06. In contrast, the polymers in accordance with examples 2-6 in accordance with the present disclosure exhibited an average weight loss percentage, after 41 minutes of from 0.70 to 0.79. As such, the examples in accordance with the present disclosure demonstrate significantly less thermal degradation over time as compared to the example of the prior art.

Figure 8:
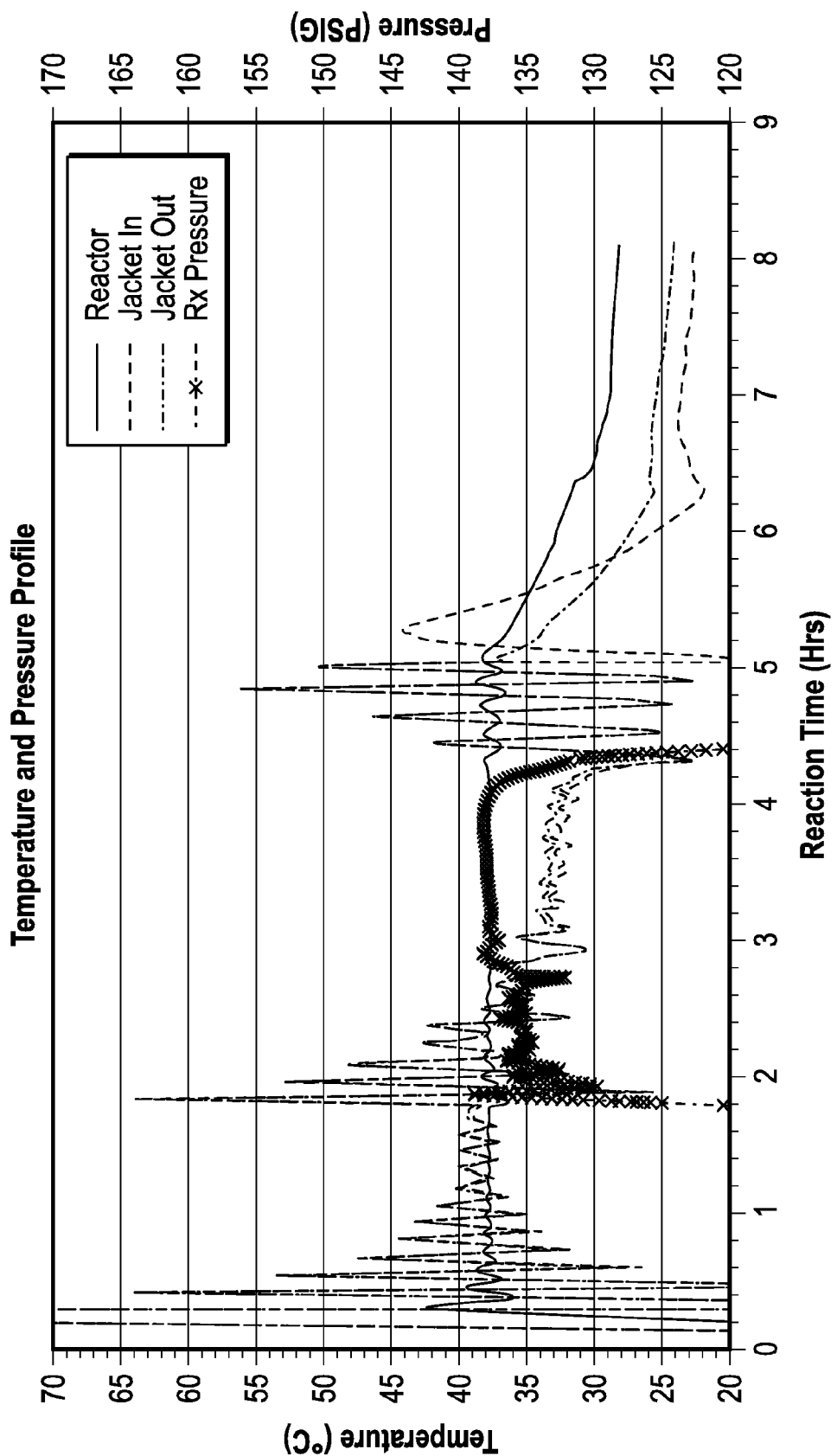
FIGS. 8 and 9 are plots illustrating temperatures and pressures, over time, within a reaction vessel during synthesis of a CTFE-based polymer in accordance with further embodiments of the present disclosure.

In accordance with a seventh example, a PCTFE polymer was produced using conventional processing techniques. 0.6 kg of CTFE monomer was charged to a 3 gallon reactor vessel at 37.7° C. and at a pressure of 127 $psi_g$, along with deionized water as a solvent, and potassium persulfate with iron as an initiator. The reaction was allowed to proceed for a time period of about 5 hours. An additional 2.17 kg of CTFE was added at about 1 hour after reaction initiation, for a total of 2.77 kg of CTFE. The pH of the reaction mixture, throughout the reaction process, remained at about 1.8. The addition of sodium metabisulfite (MBS) to the reactor was stopped after 3 hours at a pressure of 90 $psi_g$. Excess pressure was then vented over 1 hour period and then two 250 mL portions of 25 weight-% lithium citrate solution was added to the reaction mixture and stirred at 29.3° C. for 30 minutes. FIG. 8 illustrates the temperature and pressure within the reaction vessel during the polymerization reaction process. The addition of the lithium citrate solution, in addition to terminating the polymerization reaction, increased the pH of the reaction mixture to about 5.1.

In accordance with an eighth example, a PCTFE polymer was produced using conventional processing techniques. 6 kg of CTFE monomer was charged to a 30 gallon reactor vessel at 37.7° C. and at a pressure of 127 $psi_g$, along with deionized water as a solvent, and potassium persulfate with iron as an initiator. The reaction was allowed to proceed for a time period of about 9 hours. An additional 10 kg of CTFE was added at about 1 hour after reaction initiation, and a further additional 10 kg of CTFE was added at about 3.5 hours after reaction initiation, for a total of 26 kg of CTFE. The pH of the reaction mixture, throughout the reaction process, remained at about 2.1. The addition of sodium metabisulfite (MBS) to the reactor was stopped after 8 hours at a pressure of 90 $psi_g$. Excess pressure was then vented over a 0.5 hour period and then the reaction mixture was split into eight equal installments. The first installment was then neutralized with 320 mL of 20 wt. % ammonium citrate solution and stirred at ambient temperature and pressure for 3 hours. The addition of the ammonium citrate solution, in addition to terminating the polymerization reaction, increased the pH of the reaction mixture to about 4.94.

Figure 9:
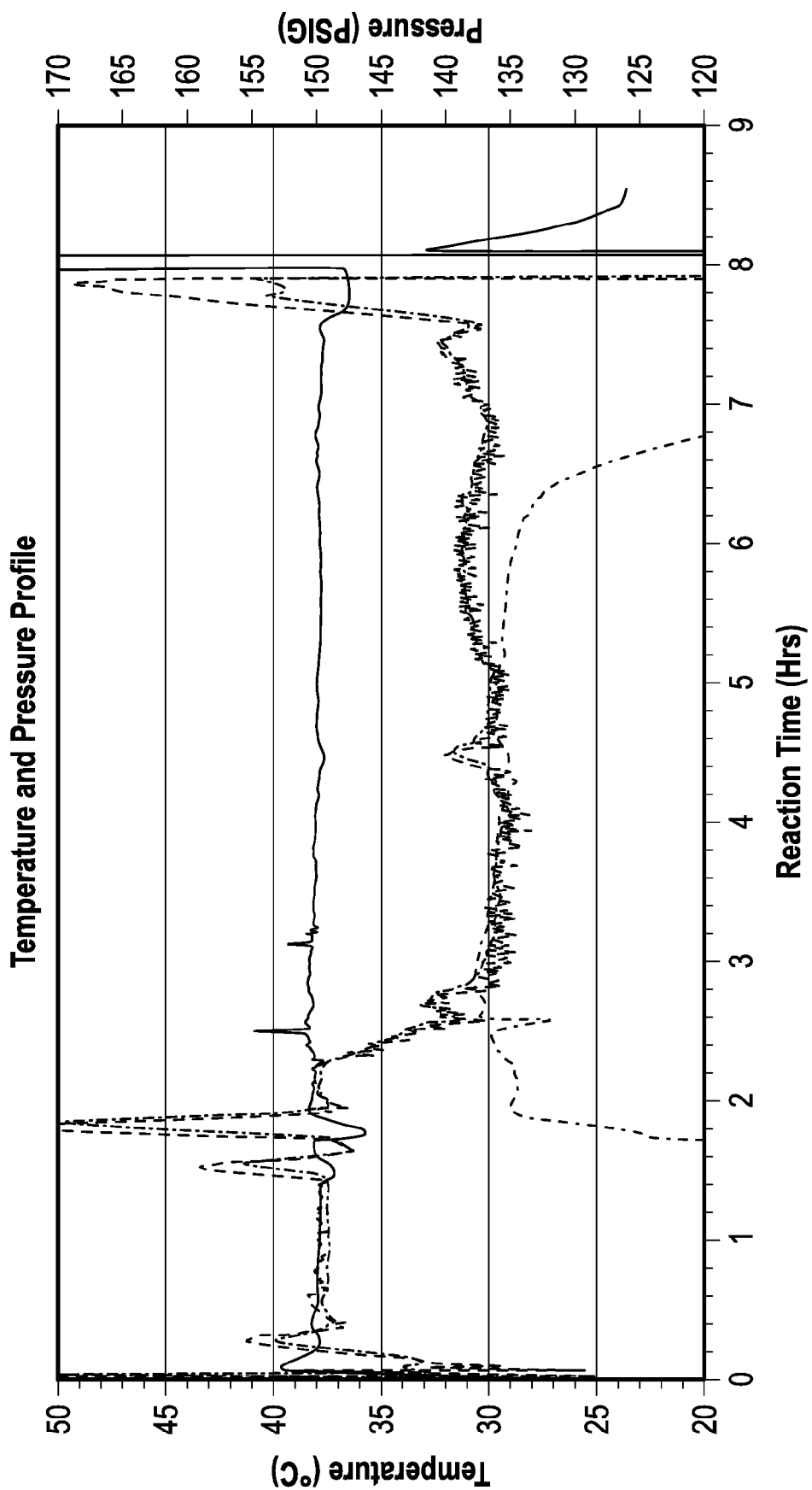

In accordance with a ninth example, a PCTFE polymer was produced using the processing techniques substantially as described above with regard to the first example, with the exception that the polymerization reaction was stopped after 6 hours at 90 $psi_g$ by stopping the addition of MBS solution to the reactor. Then 72.14 g of sodium hydroxide dissolved in 476.2 g of deionized water (13.2 wt. %) was added to the reaction mixture at 37.5° C. and 89.8 $psi_g$ pressure, stirred for 10 minutes, and then vented. FIG. 9 illustrates the temperature and pressure within the reaction vessel during the polymerization reaction process.

As such, described herein are embodiments of improved PCTFE homo and copolymers that are suitable for the production of articles therefrom when processed at elevated temperatures, or to be included in the structure of the formed article. The embodiments also described methods for the production of thermally stable, less acidic PCTFE homo and copolymers that feature improved machine processability, particularly with regard to melt-extrusion, pelletization, thermoforming, and lamination.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope as set forth in the appended claims and their legal equivalents.

What is claimed is:

1. A method for synthesizing chlorotrifluoroethylene (CTFE)-based polymers comprising:
   reacting, in the presence of an initiator and in a reaction medium at a pH of about 1.5 to about 2.5, one or more monomers comprising CTFE; and
   after an amount of polymerization reaction time has passed, adding a neutralizing agent to the reaction medium to increase the pH of the reaction medium to within a range of about 1.8 to about 6.0.

2. The method of claim 1, wherein adding the neutralizing agent comprises adding an aqueous base or a buffer solution.

3. The method of claim 2, wherein adding the neutralizing agent comprises adding the neutralizing agent after an amount of polymerization reaction time of about 1 hour to about 24 hours has passed.

4. The method of claim 3, wherein adding the neutralizing agent comprises adding the neutralizing agent after an amount of polymerization reaction time of about 1 hour to about 12 hours has passed.

5. The method of claim 3, wherein adding the neutralizing agent comprises adding a buffer solution having a pH of about 3.0 to about 7.0 after the amount of polymerization reaction time has passed.

6. The method of claim 5, wherein adding the buffer solution comprises adding an aqueous solution that is selected from the group consisting of: acetate, citrate, phosphate, and lactate solutions, and mixtures thereof, after the amount of polymerization reaction time has passed.

7. The method of claim 6, wherein adding the buffer solution comprises adding an aqueous solution that is selected from the group consisting of: ammonium lactate, sodium lactate, and potassium lactate solutions, and mixtures thereof, after the amount of polymerization reaction time has passed.

8. The method of claim 7, wherein adding the buffer solution comprises adding an aqueous ammonium lactate solution after the amount of polymerization reaction time has passed.

9. The method of claim 8, wherein adding the buffer solution comprising adding an aqueous ammonium lactate solution wherein a concentration of the ammonium lactate in the solution is from about 5 to about 75 weight-% based on total solution weight.

10. The method of claim 9, wherein adding the buffer solution comprising adding an aqueous ammonium lactate solution wherein a concentration of the ammonium lactate in the solution is from about 40 to about 65 weight-% based on total solution weight.

11. The method of claim 9, wherein adding the ammonium lactate solution comprises adding about 1.0 to about 5.0 mole-% of ammonium lactate based on the one or more monomers.

12. The method of claim 11, wherein adding the ammonium lactate solution comprises adding about 1.0 to about 2.0 mole-% of ammonium lactate based on the one or more monomers.

13. The method of claim 3, wherein adding the neutralizing agent comprises adding an aqueous base solution comprising sodium hydroxide or potassium hydroxide after the amount of polymerization reaction time has passed.

14. The method of claim 1, wherein reacting one or more monomers comprising CTFE comprises reacting one or more monomers comprising CTFE and one or more monomers selected from the group consisting of: vinylidene fluoride, 1,2-difluoroethylene, vinylidene chloride, 1,1-dichlorodifluoroethylene, 1,2-dichlorodifluoroethylene, 1-chloro-1-fluoroethylene, tetrafluoroethylene, trifluoroethylene, vinyl fluoride, hexafluoropropylene, hexafluoroisobutylene, perfluorobutylethylene, pentafluoropropene, 3,3,3-trifluoro-1-propene, 2,3,3,3-tetrafluoropropene, 1,3,3,3-tetrafluoropropene, fluorinated vinyl ethers, fluorinated allyl ethers, fluorinated dioxoles, olefins, and functionalized olefins, and combinations thereof.

15. The method of claim 1, wherein adding the neutralizing agent comprises adding the neutralizing agent at a reaction pressure of about 50 $psi_g$ to about 150 $psi_g$.

16. The method of claim 1, further comprising performing a heat-up/cool-down procedure after adding the neutralizing agent.

17. The method of claim 1, further comprising filtering and drying a CTFE-based polymer product after adding the neutralizing agent.

18. The method of claim 17, further comprising thermally processing the CTFE-based polymer product after filtering and drying the CTFE-based polymer product.

19. A method for synthesizing chlorotrifluoroethylene (CTFE)-based polymers comprising:
   reacting, in the presence of an initiator and in a reaction medium at a pH of about 1.5 to about 2.5, one or more monomers comprising CTFE;
   after a polymerization reaction time of about 1 hour to about 24 hours has passed, adding a neutralizing agent comprising a buffer solution comprising an aqueous ammonium lactate solution to the reaction medium to increase the pH of the reaction medium to within a range of about 1.8 to about 6.0, wherein the aqueous ammonium lactate solution comprises ammonium lactate in an amount from about 5 to about 75 weight-% based on total weight of the solution, and wherein adding the ammonium lactate solution comprises adding about 1.0 to about 5.0 mole-% of ammonium lactate based on the one or more monomers; and
   filtering and drying a CTFE-based polymer product after adding the neutralizing agent.

20. A method for manufacturing a chlorotrifluoroethylene (CTFE)-based polymer product comprising:
   reacting, in the presence of an initiator and in a reaction medium at a pH of about 1.5 to about 2.5, one or more monomers comprising CTFE;
   after a polymerization reaction time of about 1 hour to about 12 hours has passed, adding a neutralizing agent comprising a buffer solution comprising an aqueous ammonium lactate solution to the reaction medium to increase the pH of the reaction medium to within a range of about 1.8 to about 5.0, wherein the aqueous ammonium lactate solution comprises ammonium lactate in an amount from about 40 to about 65 weight-% based on total weight of the solution, and wherein adding the ammonium lactate solution comprises adding about 1.0 to about 2.0 mole-% of ammonium lactate based on the one or more monomers;
   filtering and drying a CTFE-based polymer product after adding the neutralizing agent; and
   thermally processing the CTFE-based polymer product after filtering and drying the CTFE-based polymer product at a temperature of about 275° C. to about 325° C.

* * * * *